United States Patent [19]
Lee et al.

[11] Patent Number: 5,961,682
[45] Date of Patent: Oct. 5, 1999

[54] METHOD OF FABRICATING OPTICAL FIBER DOPED WITH RARE EARTH ELEMENT USING VOLATILE COMPLEX

[75] Inventors: Yong-woo Lee, Yongin-gun, Rep. of Korea; Alexey Nikolaevich Guryanov, Novgorod, U.S.S.R.; Vladimir Fedororich Khopin, Novgorod, U.S.S.R.; Dmitry D. Gusovsky, Novgorad, U.S.S.R.

[73] Assignee: Samsung Electronics Co., Ltd., Kyungki-do, Rep. of Korea

[21] Appl. No.: 08/745,653

[22] Filed: Nov. 12, 1996

Related U.S. Application Data

[62] Division of application No. 08/536,776, Sep. 29, 1995, abandoned.

[30] Foreign Application Priority Data

Jul. 12, 1995 [KR] Rep. of Korea .................. 95-20484

[51] Int. Cl.[6] .................................................. C03B 37/027
[52] U.S. Cl. .............................. 65/384; 65/390; 65/394; 65/426; 65/417
[58] Field of Search ........................... 65/422, 390, 399, 65/384, 417, 426

[56] References Cited

U.S. PATENT DOCUMENTS

| | | | |
|---|---|---|---|
| 4,787,927 | 11/1988 | Mears | 65/417 |
| 4,826,288 | 5/1989 | Mansfield . | |
| 5,141,549 | 8/1992 | Tumminelli | 65/386 |

FOREIGN PATENT DOCUMENTS 1766854  10/1992  U.S.S.R. .

OTHER PUBLICATIONS

English Translation of SU 1766854.

*Primary Examiner*—John Hoffmann
*Attorney, Agent, or Firm*—Burns, Doane, Swecker & Mathis, L.L.P.

[57] ABSTRACT

A method of fabricating an optical fiber doped with a rare earth component using a volatile complex, which flattens the light frequency response under a stimulated emission of radiation principle using a modified chemical vapor deposition method. Silicon tetrachloride ($SiCl_4$) and oxygen are injected into a quartz reaction tube under a heating process, so that a cladding layer is repeatedly deposited. Then, a volatile organic metal chelate, silicon tetrachloride and oxygen are injected into the quartz reaction tube, and then heated and water-cooled to form a porous layer. At the same time, a rare earth element is deposited on the porous layer, to thereby form a core layer. Thereafter, via a high heating process, a preform is completed. Then, an optical fiber is obtained from the preform via a drawing-out process. Here, hydroxide ions ($OH^-$) which occur as the organic ligand is volatilized and cause an optical loss of the optical fiber is removed as the porous layer is formed by the water-cooling, and an added rare earth content is easily controlled, so that the rare earth with high concentration is evenly distributed. Also, since the core laver adopts $SiO_2$ and $Al_2O_3$ as a host material instead of $GeO_2$, the difference in a refractive index between the cladding and core layers becomes greater then 0.025, to thereby provide the optical fiber with excellent optical characteristics.

21 Claims, 8 Drawing Sheets

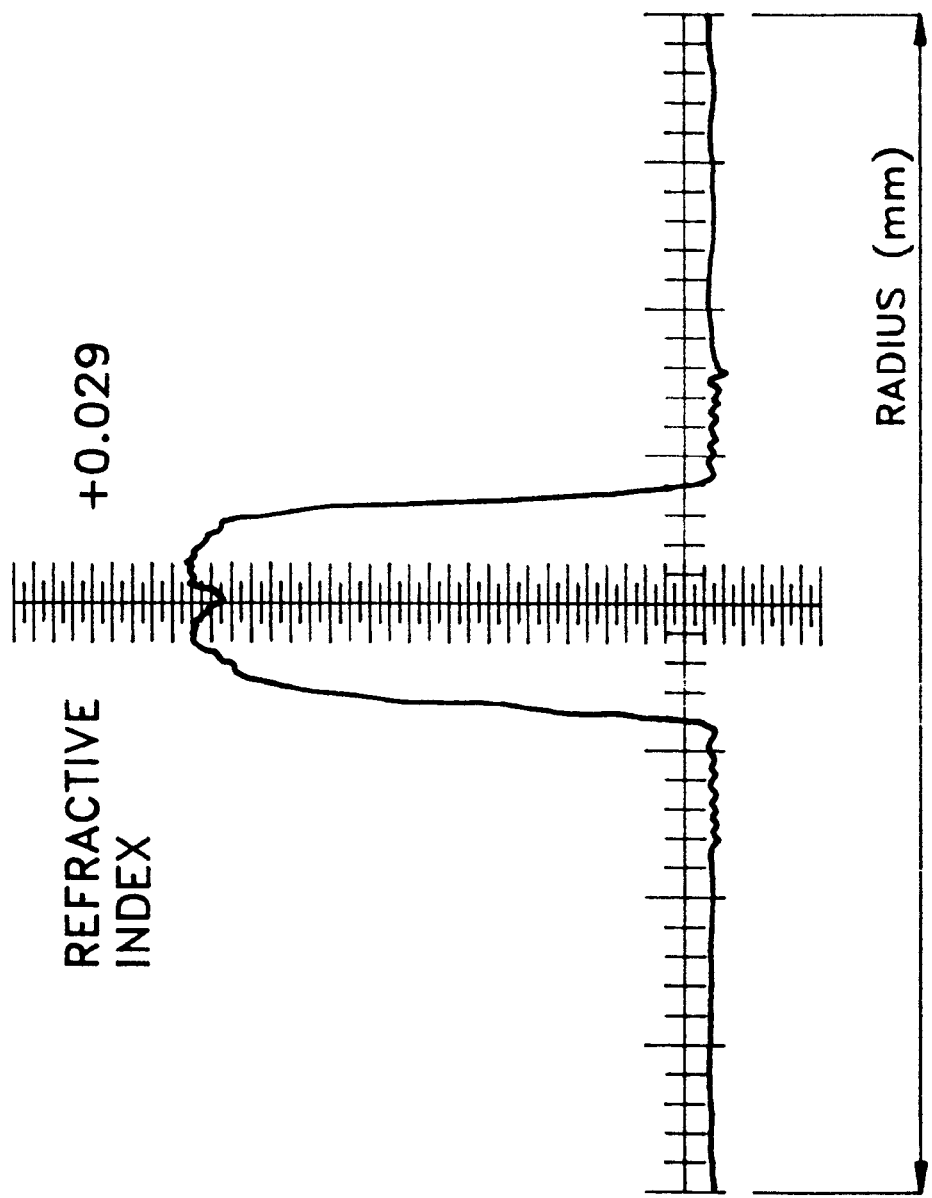

METHOD OF FABRICATING OPTICAL FIBER DOPED WITH RARE EARTH ELEMENT USING VOLATILE COMPLEX

This application is a divisional of application Ser. No. 08/536,776, filed Sep. 29, 1995 abandoned.

BACKGROUND OF THE INVENTION

The present invention relates to a method of fabricating optical fiber doped with a rare earth element using a modified chemical vapor deposition method, in which a volatile complex is used for flattening a light frequency response according to a stimulated emission of radiation principle, to thereby make a porus core layer with a high rare earth content.

A optical fiber as a medium for transmitting light has a core at the center thereof and a cladding layer around the core. The refractive index of the core should be slightly greater than that of the cladding layer so as to fully reflect light in the core. In order to fabricate the optical fiber, a glass rod (called a "preform") is made. Then, the glass rod is placed atop a drawing tower. The preform is made by using various methods such as a modified chemical vapor deposition (MCVD) method, a vapor axial deposition (VAD) method and an outside vapor deposition (OVD) method.

FIG. 1 shows MCVD method developed for manufacturing the preform. According to this method, quartz (silicon dioxide) is used as a major material, into which other oxides such as germanium (Ge), phosphorus (P) and boron (B) oxides are mixed to control the refractive index. This method is being widely used to produce quartz-type optical fiber in great quantities. Referring to FIG. 1, the optical fiber manufacturing apparatus is composed of a bubbler 1 for supplying reactants such as silicon tetrachloride ($SiCl_4$), phosphate chloride ($POCl_3$) and germanium tetrachloride ($GeCl_4$), as deposition material, in a vapor state, a vapor transporter 2 for transporting the vapor reactants to a quartz reaction tube 3. The and quartz reaction tube 3 is for reacting the vapor reactants supplied from bubbler 1 and then depositing the reacted vapor.

First, quartz reaction tube 3 is cleaned to remove impurities and then the quartz reaction tube 3 is installed at the manufacturing system. Thereafter, silicon tetrachloride ($SiCl_4$) gas provided from bubbler 1 flows into the rotary quartz tubes 3 together with dioxide ($O_2$) via vapor transporter 2 while heating the quartz reaction tube 3 using a burner 5. During the heating process, the burners is continuously shifted laterally so that a silicon dioxide ($SiO_2$) layer 4 is deposited over the whole interior of the quartz reaction tube 3 through the reaction of the gases therein. This becomes material of the cladding layer and the reaction formula is as follows.

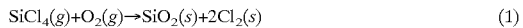

$$SiCl_4(g)+O_2(g) \rightarrow SiO_2(s)+2Cl_2(s) \qquad (1)$$

Thereafter, germanium tetrachloride ($GeCl_4$) is added to silicon tetrachloride ($SiCl_4$) and dioxide ($O_2$) and the above processes are repeated, so that silicon dioxide ($SiO_2$) layer and germanium dioxide ($GeO_2$) layer are deposited. Here, the reaction formula is as follows, by which germanium dioxide ($GeO_2$) layer is deposited.

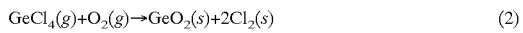

$$GeCl_4(g)+O_2(g) \rightarrow GeO_2(s)+2Cl_2(s) \qquad (2)$$

Here, the distribution of refractive index can be controlled by changing each component ratio of initial materials (reactants) on every pass of the burner. These deposited layers become materials of the core and have a higher refractive index than that of the material forming the cladding layer.

In order to obtain an optical fiber having new optical characteristics according to the induced radiation principle, various elements, especially, rare earth elements, are added to the core through which light passes. Since the optical fiber having new optical characteristics can be applied to an optical amplifier or a laser, research into the method of adding the rare earth element is being widely performed. Here, the valence of the deposited rare earth ion is three. The deposited rare earth ion operates as a network modifier and forms a deposited layer together with silicon dioxide ($SiO_2$) which is a network former. Here, a high concentration nonbridging oxygen group is required as the rare earth ion is added, and a short reaction distance in the reaction tube 3 requires rare earth ions with high concentration.

For example, in the case of pure silicon dioxide without network modifier, there is a fixed structure and the nonbridging Si—O$^-$ group is short. Thus, the coordinate linkage of the rare earth ions becomes difficult, the solubility is insufficient and clustering phenomenon occurs. The clustering phenomenon adversely affects the optical characteristics of the material. Thus, another element should be added in order to solve the problem. As an example, good results can be obtained by adding aluminum ($Al_2O_3$) to the core.

When replacing the conventional deposited germanium dioxide with aluminum oxide ($Al_2O_3$), the solubility of a rare earth element in silicon dioxide (silica) is directly affected by the addition of aluminum. Also, since germanium is not combined with the rare earth ion, the clustering between rare earth ions is observed. On the other hand, the addition of aluminum relieves the clustering phenomenon and then more rare earth elements can be added. As above, aluminum oxide as an additive for increasing the refractive index can replace germanium oxide ($GeO_2$) used in the conventional method, and can be deposited together with germanium oxide ($GeO_2$). The reaction formula is as follows, by which aluminum oxide ($Al_2O_3$) is deposited.

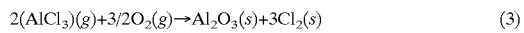

$$2(AlCl_3)(g)+3/2O_2(g) \rightarrow Al_2O_3(s)+3Cl_2(s) \qquad (3)$$

Even if aluminum oxide ($Al_2O_3$) is added together with germanium oxide ($GeO_2$), the addition of aluminum oxide ($Al_2O_3$) prevents the rare earth element from disappearing. This method improves the efficiency of an optical fiber made by the MCVD method.

As shown in FIG. 2, a quartz tube in which the deposited layers are stacked via the above process is heated at a high temperature and then the quartz tube is via collapsed and closing steps, to thereby reduce inner space and agglutinate each deposited layer. As a result, a preform which is thinner than the initial quartz tube is completed.

However, adding the rare earth element to the core affects to the optical characteristics, and research into a new adding method is being conducted. Five such adding methods will be described.

First, as shown in FIG. 2, a dopant chamber may be used. Here, a concave chamber 9 is formed by reforming a front portion of a quartz tube, into which reactants are introduced. Then, a molten rare earth halide 10, especially, a molten rare earth chloride, is applied to the inner wall of chamber 9. When chamber 9 is heated using a fixed burner 5a to about 1000° C., the rare earth chloride flows along the quartz tube in a gaseous state. As a result, the rare earth chloride gas combines with oxygen at a hot region heated by a moving burner 5b (deposition burner) and then the complex is deposited at the inner side of cladding layer 7 formed on the inner wall of the quartz reaction tube 3, to thereby form a core layer 6. However, since the vapor pressure of the rare earth chloride is very low, the heating process should be performed at a higher temperature so as to obtain a usable vapor pressure. Also, it is difficult to completely remove such impurities as Fe, Cu, Ca or Si under low vapor pressure.

Second, as shown in FIG. 3, when the dopant chamber 9 shown in FIG. 2 is replaced into a quartz sponge 11 into which rare earth salt is permeated, a quartz reaction tube 9 as shown in FIG. 2 is not required and the step of drying dopant salt can be performed as a separate step. However, this method is only useful for depositing a low-concentration rare earth element.

Third, as shown in FIG. 4, there is a method using an ampoule injector 12 in which rare earth halide 10 is placed. Aluminum chloride ($Al_2Cl_6$) and rare earth chloride gas are supplied at the same time to ampoule injector 12 heated to about 1000° C. by fixed burner 5a, to thereby form an Al-rare earth complex inside wall of quartz reaction tube 3 in combined with oxygen at a hot zone of quartz reaction tube 3 heated by a deposition burner (moving burner 5b). As a result, the rare earth element and aluminum are deposited. However, since the vapor pressure of rare earth chloride as a starting material is very low, the ampoule injector 12 should be heated to a higher temperature so as to obtain a usable vapor concentration.

Fourth, as shown in FIG. 5, there is a solution doping method in which a porous layer is formed and then a solution including rare earth element and aluminum is permeated thereinto. First, a plurality of core layers 6 are deposited by controlling the composition ratio of the starting material (reactants) and then cooled with a water cooler 14, thereby to form porous layer 13. Here, if the heating is performed at a lower temperature than that of deposition burner (moving burner 5) used for forming the core layer, the reaction between reactants occurs while the complete deposition does not occur since the temperature is not enough for deposition, so that incomplete porous layer 13 is formed. Then, solution 15 including the rare earth element and aluminum is poured into the resultant. After a predetermined lapse of time, the solution is poured from porous layer 13 and then porous layer 13 is dried. As a result, the rare earth element and aluminum are deposited to form a porous core layer 16. Here, reference numeral 7 represent the cladding layer. However, due to a special aspect of the MCVD process, water used for cooling the outside of the quartz reaction tube 11 flows out and then wets the equipment, and the uniformity of the formed porous layer 13 decreases. Also, if only silicon oxide ($SiO_2$) and aluminum oxide ($Al_2O_3$), other than germanium oxide ($GeO_2$), are used as a host for depositing the core layer, it is difficult for the difference in refractive index ($\Delta n$) of the preform to be over 0.015.

Fifth, there is a method using a rare earth-added volatile complex, where an organic ligand in the complex is volatilized and the rare earth element is added. The merit of this method is that the high concentration rare earth can be added using the rare earth-added volatile complex, and the internal structure of the optical fiber can be controlled since the complex can be partially added to the core layer. In addition, the solubility of the rare earth element can be increased by adding aluminum oxide ($Al_2O_3$) together therewith. However, since hydroxide ion ($OH^-$) occurs when the organic ligand volatilizes in the volatile complex, the optical loss of the optical fiber occurs and it is difficult for the remaining rare earth element to be deposited to a uniform thickness. Thus, the difference in the refractive index ($\Delta n$) between the cladding and core layers is severe and the difference in the refractive index is small. Also, a research for eliminating germanium (Ge) from the host matrix of the optical fiber is required so as to improve the gain with high concentration rare earth element.

SUMMARY OF THE INVENTION

It is an object of the present invention to provide a method of fabricating an optical fiber doped with a rare earth element using a volatile complex, without germanium, in which the concentration of the added rare earth element can be freely controlled and impurities such as hydroxide ions ($OH^-$) are removed, so that the rare earth element is evenly deposited and the difference in the refractive index between a cladding layer and a core layer is increased.

To achieve the above object, there is provided a method of fabricating an germanium-free optical fiber by a modified chemical vapor deposition method comprising the steps of: forming a cladding layer; and forming a porous core layer by doping a volatile metal organic chelates with rare earth ions on the cladding layer, wherein the difference in the refractive index between the cladding layer and the porous core layer is above 0.015.

Preferably, a method of forming the cladding layer comprises the steps of mixing $SiCl_4$, $POCl_3$, Freon gas and $O_2$, and of heating the mixture from the outside, and a method of forming the porous core layer comprises the steps of mixing a volatile organic metal chelate having rare earth ions with $SiCl_4$ and $O_2$, and of sequentially heating and cooling the mixture from the outside. Here, one selected from the group consisting of $Al_2Cl_6$ and $SiF_4$ is added during the mixing step for forming the porous core layer. Also, it is preferable that an impurity such as hydroxide ions ($OH^-$) is removed after the porous core layer is formed on the cladding layer. Here, the hydroxide ions ($OH^-$) is removed by the steps of reacting $CCl_4$ with $O_2$, and of reacting $Cl_2$ gas obtained through the reaction between $CCl_4$ and $O_2$ with $OH^-$ gas, and a heating process is simultaneously performed when $Cl_2$ gas reacts with $OH^-$ so as to remove the hydroxide ion ($OH^-$). The volatile organic metal chelate including rare earth ions are formed by combining of the volatile organic metal ligand and the rare earth ions, the volatile organic metal ligand is composed of tris-cyclopentadienyl or tris-isopropylcyclopentadienyl, and the rare earth ions are one selected from the group consisting of Dy, Er and Yb.

To achieve the above method, there is provided a method of fabricating an optical fiber by a modified chemical deposition method comprising the steps of: forming a cladding layer; forming a core layer by doping a volatile metal organic chelates with rare earth ions on the cladding layer; and removing hydroxide ion ($OH^-$) after forming the core layer.

Preferably, the core layer is made without germanium, the hydroxide ion ($OH^-$) is removed by the steps of reacting $CCl_4$ with $O_2$, and of reacting $Cl_2$ gas obtained through the reaction between $CCl_4$ and $O_2$ with $OH^-$ gas, and a heating process is simultaneously performed when $Cl_2$ gas reacts with $OH^-$ gas so as to remove the hydroxide ion ($OH^-$).

It is preferable that a method of forming the cladding layer comprises the steps of mixing $SiCl_4$, $POCl_3$, Freon gas and $O_2$, and of heating the mixture from the outside, and the core layer is porous. Also, a method of forming the porous core layer comprises the steps of mixing a volatile organic metal chelate having rare earth ions with $SiCl_4$ and $O_2$, and of simultaneously heating and cooling the mixture from the outside, and one of selected from $Al_2Cl_6$ and $SiF_4$ is added during the mixing step for forming the porous core layer. Also, it is preferable that the difference in the refractive index between the cladding layer and the porous cladding layer is above 0.015, the volatile organic metal chelate including rare earth ions are formed by combining of the volatile organic metal ligand and the rare earth ions, and the volatile organic metal ligand is composed of tris-cyclopentadienyl or tris-isopropylcyclopentadienyl. Also, the rare earth ions are one selected from the group consisting of Dy, Er and Yb.

BRIEF DESCRIPTION OF THE DRAWINGS

The above objects and advantages of the present invention will become more apparent by describing in detail a preferred embodiment thereof with reference to the attached drawings in which:

FIG. 13 is a refractive index profile of a preform, obtained using dipivaloilmethane erbium as a volatile complex and aluminum.

DETAILED DESCRIPTION OF THE INVENTION

Figure 12:
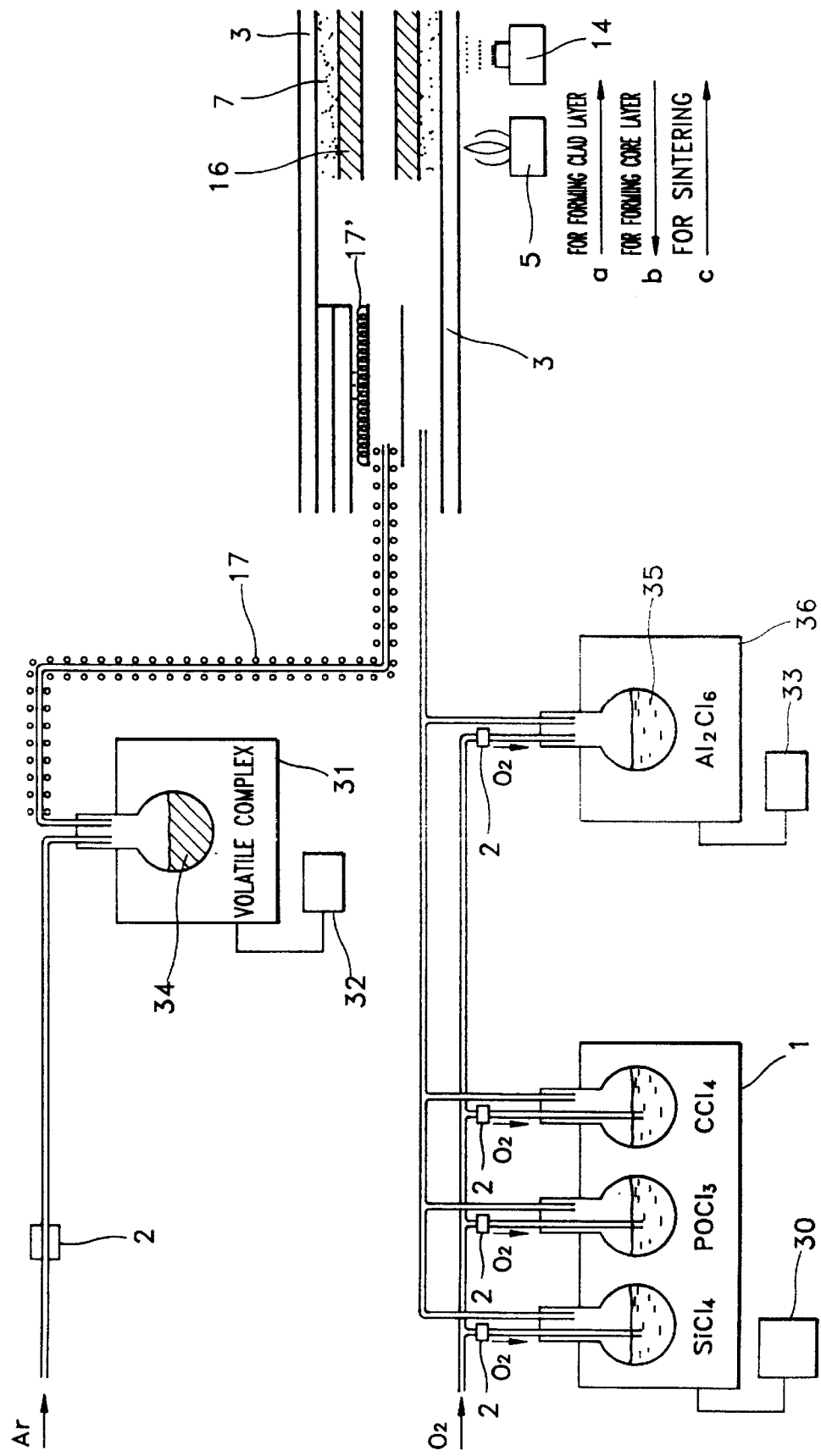
FIG. 12 is a structural diagram of an apparatus for adding a volatile complex and aluminum oxide ($Al_2O_3$) at the same time, according to the method of the present invention.

Referring to FIG. 12 showing an arrangement of a bubbler 1, a quartz reaction tube 3, a moving burner 5 and a water cooler 14, the structure of the apparatus for holding a volatile complex and adding aluminum oxide ($Al_2O_3$) will be described below.

The optical fiber fabricating apparatus according to the present invention comprises a first bubbler 1 for supplying reactant such as silicon chloride ($SiCl_4$), $POCl_3$ and carbon tetrachloride ($CCl_4$) as a deposition material in a vapor, a quartz reaction tube 3 in which the rare earth element of the vapor of reactants provided from first bubbler 1 react each other and is then deposited, a second bubbler 31 for supplying a volatile complex 34 to quartz reaction tube 3 without being volatilized, a third bubbler 36 for supplying aluminum chloride ($Al_2Cl_6$) to quartz reaction tube 3 in a vapor, a moving burner 5 for heating each portion of quartz reaction tube 3 while moving along quartz reaction tube 3, to which volatile complex 34 of second bubbler 31 and aluminum oxide ($Al_2O_3$) vapor of third bubbler 36 are provided, and a water cooler 14 for cooling quartz reaction tube 3 to form porus layer 16. Here, reference numerals 30, 32 and 33 denote the first, second and third temperature regulators, reference numerals 17 and 17' denote hot wires, reference numeral 2 represents a volatile complex content controller, and reference numeral 7 denotes a cladding layer.

The volatile complex which helps the deposition of rare earth element will be described prior to the description of the method of fabricating an erbium doped optical fiber using the above optical fiber fabricating apparatus.

As the volatile complex used for depositing the rare earth element according to the present invention, there are a cyclopentadien complex which is formed from a rare earth element and cyclopentadien material such as tris (cyclopentadienyl) and tris(isopropylcyclopentadienyl), wherein the structure of cyclopentadien complexes made of each cyclopentadien material are similar, and a chelate compound complex which is formed from the rare earth and chelate compound such as acetylacetone, dipivaloilmethane, trifluoroacetylacetone and hexafluoracetylacetone.

Figure 1:
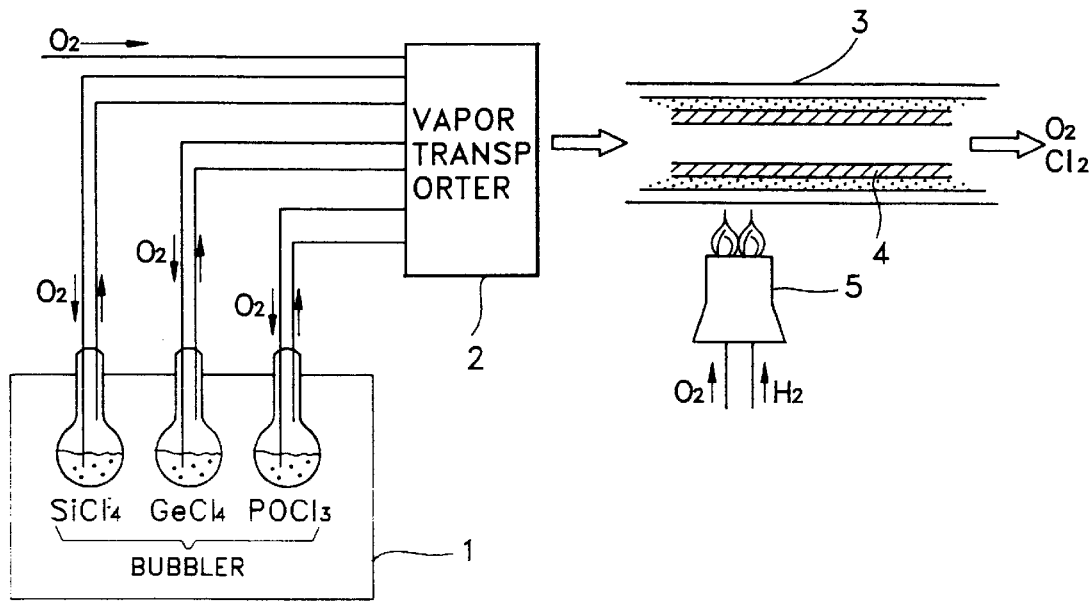
FIG. 1 is a diagram for schematically illustrating a conventional MCVD manufacturing device.
Figure 2:
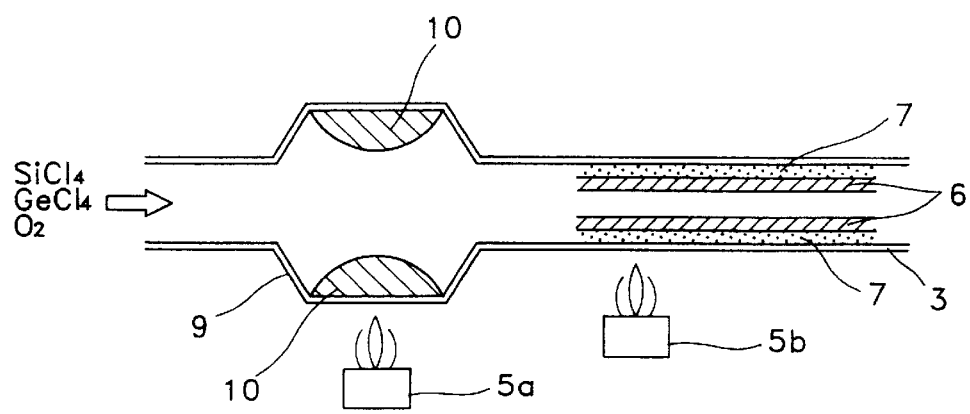
FIG. 2 is a diagram for illustrating a conventional method of adding a rare earth element using a dopant chamber.
Figure 3:
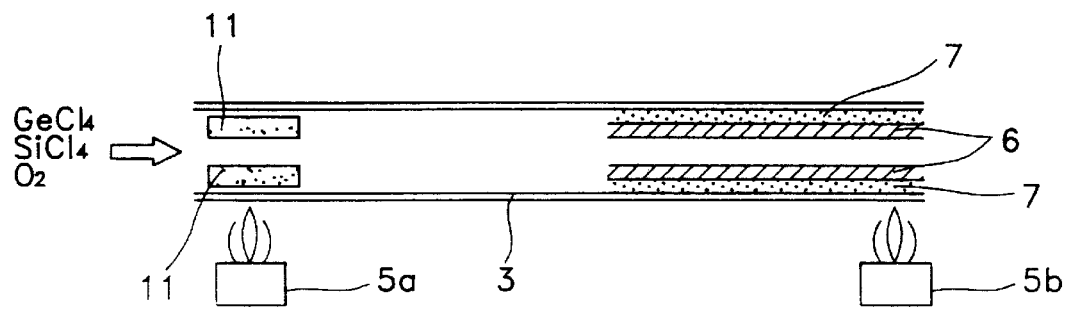
FIG. 3 is a diagram for illustrating a conventional method of adding a rare earth element using a quartz sponge into which a rare salt is absorbed.
Figure 4:
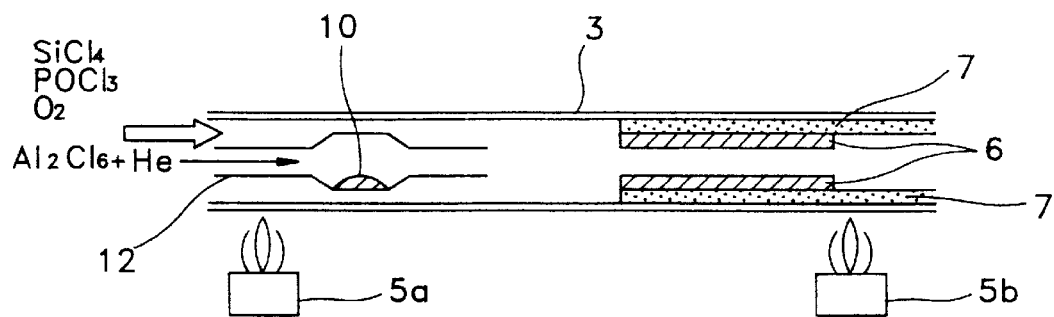
FIG. 4 is a diagram for illustrating a conventional method of adding a rare earth element and aluminum using an ampoule injector.
Figure 5:
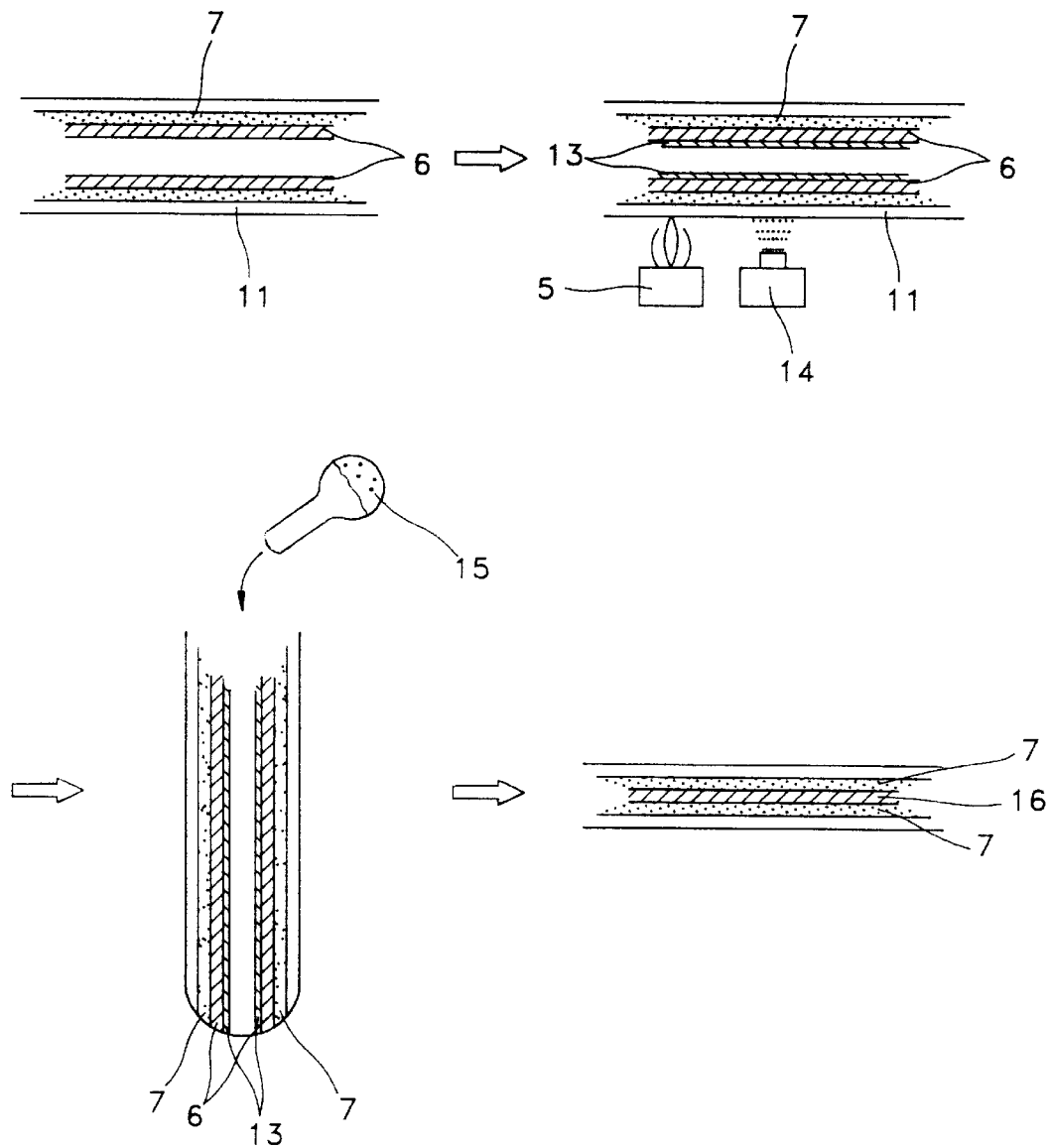
FIG. 5 is a diagram for illustrating a conventional method of adding a rare earth element and aluminum using a solution doping technology.
Figure 6:
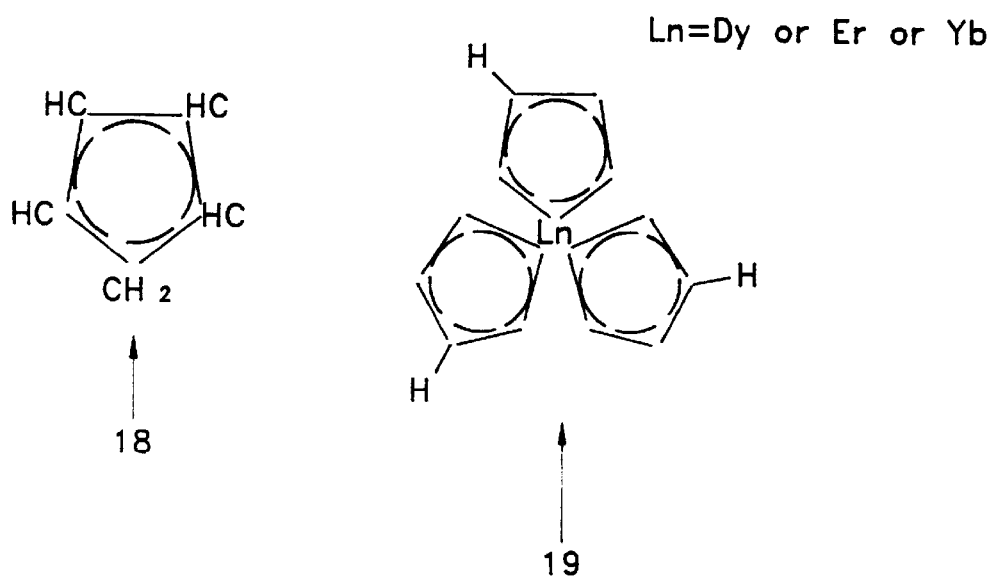
FIG. 6 is a structural formula of a volatile complex formed between an organic ligand cyclopentadiene and rare earth element.
Figure 7:
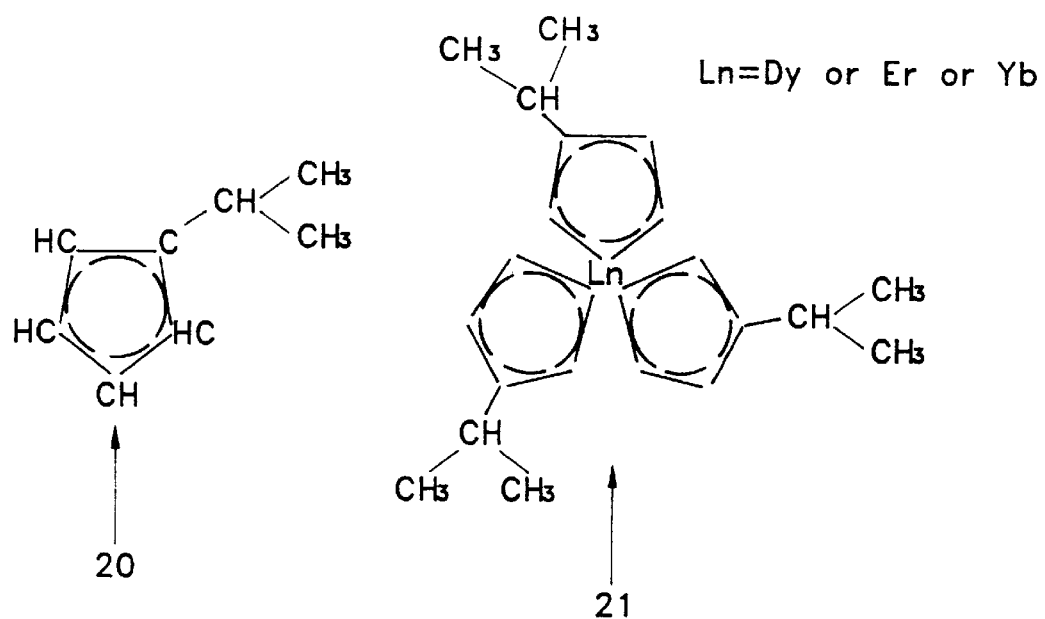
FIG. 7 is a structural formula of a volatile complex formed between an organic ligand isopropylcyclopentadiene and rare earth element.
Figure 8:
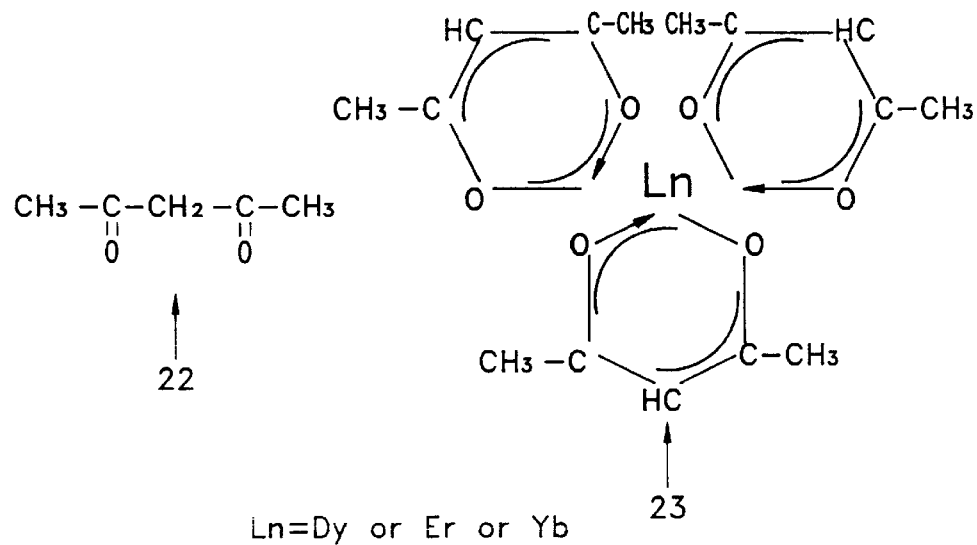
FIG. 8 is a structural formula of a chelate compound volatile complex formed between an organic ligand acetylacetone and a rare earth element.
Figure 9:
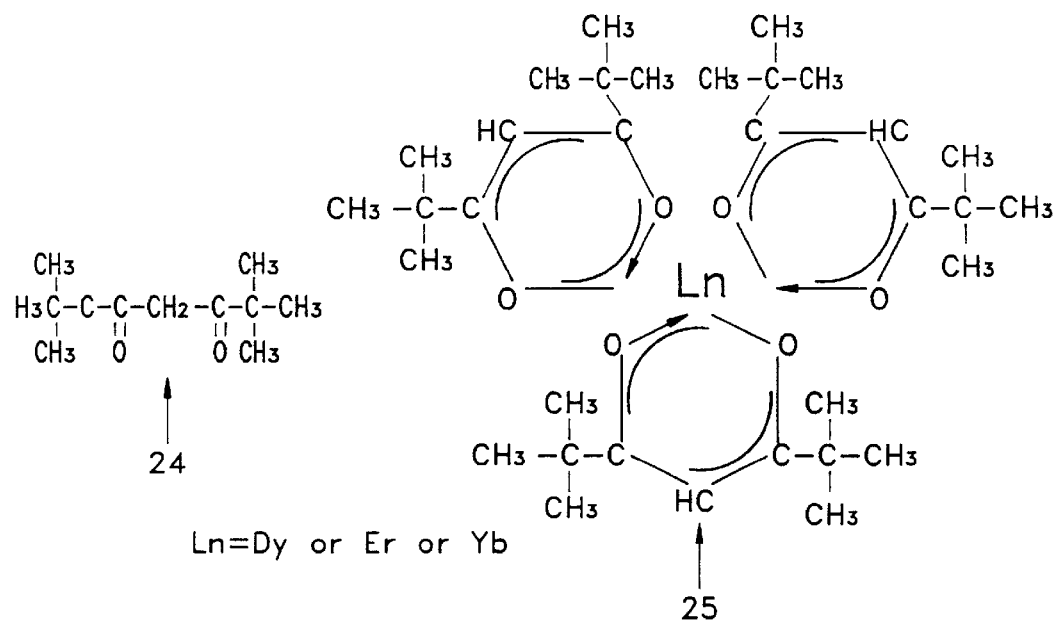
FIG. 9 is a structural formula of a chelate compound volatile complex formed between an organic ligand dipivaloilmethane and a rare earth element.
Figure 10:
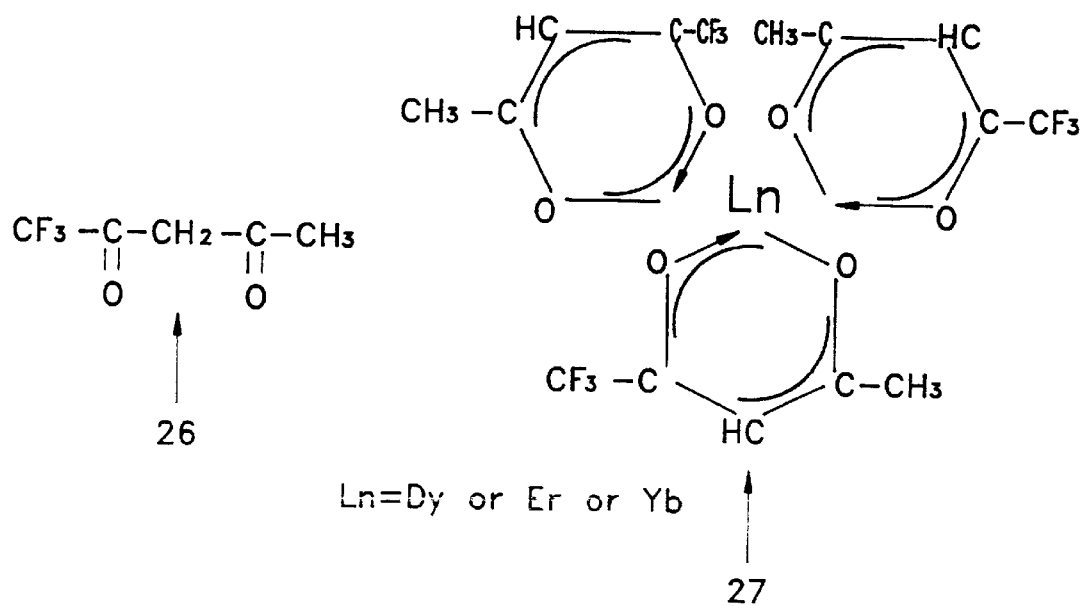
FIG. 10 is a structural formula of a chelate compound volatile complex formed between an organic ligand trifluoroacetylacetone and a rare earth element.
Figure 11:
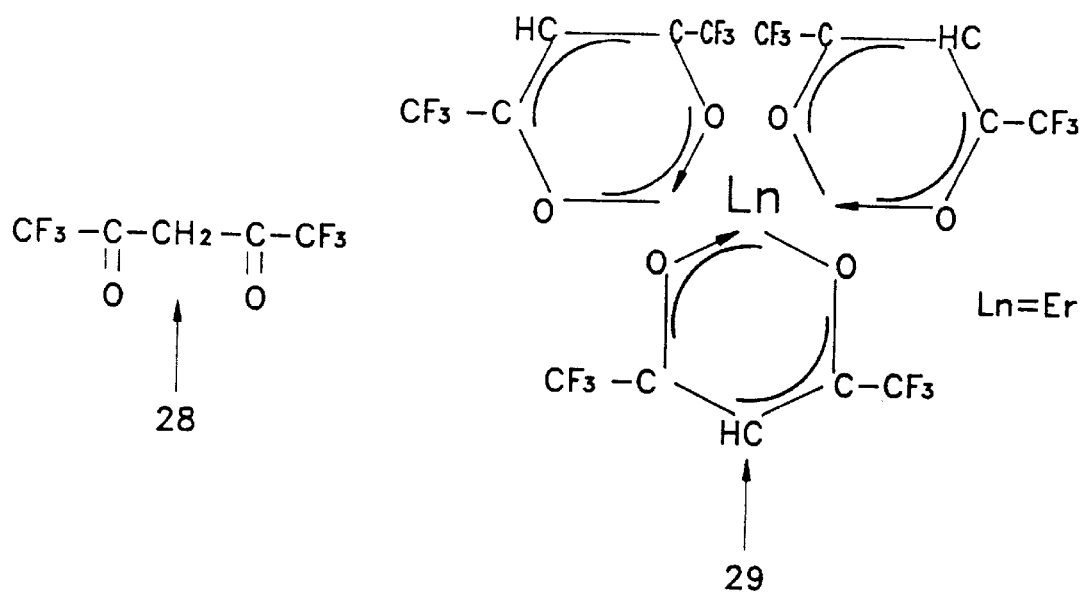
FIG. 11 is a structural formula of a chelate compound volatile complex formed between an organic ligand hexafluoracetylacetone and a rare earth element.

The structures of an organic ligand called cyclopentadien and the volatile complex formed between the organic ligand and the rare earth element are shown in FIG. 6. Here, reference numeral 18 denotes the structure of an organic ligand cyclopentadien and reference numeral 19 denotes the structure of a volatile complex formed between the organic ligand cyclopentadien and rare earth element. Also, the structures of an organic ligand called isopropylcyclopentadiene and the volatile complex formed between the organic ligand and the rare earth element are shown in FIG. 7. Here, reference numeral 20 denotes the structure of an organic ligand isopropylcyclopentadien and reference numeral 21 denotes the structure of a volatile complex formed between the organic ligand isopropylcyclopentadien and rare earth element.

The organic ligand such as acetylacetone, dipivaloilmethane, trifluoroacetylacetone and hexafluoracetylacetone are combined with the rare earth element, to thereby form the similar chelate compound complex as shown in FIGS. 8 to 11. Here, reference numeral 22 denotes the structure of an organic ligand acetylacetone, reference numeral 23 denotes the structure of a volatile complex formed between the organic ligand acetylacetone and rare earth element, reference numeral 24 denotes the structure of an organic ligand dipivaloilmethane, reference numeral 25 denotes the structure of a volatile complex formed between the organic ligand dipivaloilmethane and rare earth element, reference numeral 26 denotes the structure of an organic ligand trifluoroacetylacetone, reference numeral 27 denotes the structure of a volatile complex formed between the organic ligand trifluoroacetylaceton and rare earth element, reference numeral 28 denotes the structure of an organic ligand hexafluoracetylacetone, and reference numeral 29 denotes the structure of a volatile complex formed between the organic ligand hexafluoracetylacetone and rare earth element.

The above-described rare earth element-added volatile complex has a vapor pressure on the order of several tens of Torr at 150–130° C. while silicon tetrachloride as a starting material has a comparable vapor pressure at the room temperature. In addition, the decomposable temperature of the complex is as follows. The volatile cyclopentadiene complex is immediately hydrolyzed at above 300° C. and then oxidized, the volatile isopropylcyclopentadiene complex is properly hydrolyzed at above 260° C. and then oxidized. The volatile dipivaloilmethane complex and volatile hexafluoracetylacetone complex both forming a chelate compound are weakly hydrolyzed at above 250° C. and 230° C., respectively.

The preform is made using the volatile complex having the above organic ligand and a second bubbler 31 whose temperature is controlled in the range of 150–300° C. is required as shown in FIG. 12, so as to make the preform into the optical fiber. In order to control temperature, air-tight bubbler 31 which is stably fixed is connected to a temperature regulator 32. Also, hot wires 17 and 17' for keeping temperature of a connector for connecting bubbler 31 and the main body of the fabricating apparatus are required.

The rare earth element is deposited in quartz reaction tube 3 using the volatile complex held in the above bubblers and an additional Al-adding device 36 for adding aluminum may be included so as to increase the solubility of the deposited rare earth element and flatten the frequency response. When aluminum chloride ($Al_2Cl_6$) as a starting material for adding aluminum oxide ($Al_2O_3$) is added, the reaction temperature should be maintained at 140–150° C. since the vapor pressure thereof is lower than that of silicon chloride ($SiCl_4$) as another starting material. As shown in FIG. 12, volatile complex 34 is held in second bubbler 31 without being volatilized thereof and then transported into quartz reaction tube 3 by the control of volatile complex content controller 2, in which porous layer 13 is already formed through the water-cooling. Also, aluminum chloride ($Al_2Cl_6$) as a starting material for adding aluminum oxide ($Al_2O_3$) is transported into quartz reaction tube 3 using third bubbler 36. Then, the volatile complex transported into quartz reaction tube 3 is heated until the volatile temperature is reached using moving burner 5. As a result, the organic ligand from the volatile complex is volatilized and the rare earth element and aluminum are deposited. Here, aluminum increases the solubility of the rare earth element.

An overall method of fabricating the optical fiber doped with rare earth using a rare earth-erbium volatile complex including dipivaloilmethane as an organic ligand and the bubblers for holding the volatile complex, will be described in detail as follows. The method of fabricating the optical fiber comprises roughly the steps of forming the preform of optical fiber and of forming the optical fiber from the preform through stretching, jacketing and drawing processes.

First, the preform of the optical fiber is fabricated as follows. After quartz reaction tube 3 with 20 mm outer diameter and 16 mm inner diameter is installed, silicon tetrachloride ($SiCl_4$) in first bubbler 1 is transported thereto together with oxygen. At the same time, quartz reaction tube 3 is repeatedly heated by moving burner 5 several times in direction "a" (when burner 5 comes back, it does not heat quartz reaction tube). Here, silicon oxide ($SiO_2$) is deposited on the quartz reaction tube several times through the reaction occurring within the quartz reaction tube, to thereby produce a cladding layer 7 with a predetermined thickness. Here, when the silicon tetrachloride in first bubbler 1 maintained at 25° C. is transported to the quartz reaction tube together with oxygen, the flux is as following formula (4).

$$W_{SiCl_4} = \frac{W_{O_2}}{\frac{P_a}{P_s} - 1} \quad (4)$$

wherein $W_{O_2}$ represents the oxygen amount added to the starting substance (reactant) in the first bubbler 1, $P_a$ is the atmosphere pressure (472 mmHg) of the measuring chamber, and $P_s$ is the saturated vapor pressure (232 mmHg) of silicon tetrachloride ($SiCl_4$) of first bubbler 1 at 25° C.

In addition, a small amount of $POCl_3$ and Freon gas are added for effectively transferring the heat energy to the inner quartz reaction tube 3 whose temperature is relatively low with respect to the outer surface thereof. $POCl_3$ provides excellent heat-transfer, but, increases the refractive index. Thus, Freon gas is used for lowering the refractive index. The saturated vapor pressure of $POCl_3$ and freon gas at 25° C. is 38.5 mmHg and 338 mmHg, respectively. Thus, $POCl_3$ and Freon gas are transported into the quartz reaction tube according to the above formula (4).

Thereafter, $SiCl_4$, $Al_2Cl_6$ (or $SiF_4$) and dipivaloilmethane $(DPM)_3Er$ which is a volatile complex including erbium (Er) are transported into the quartz reaction tube 3. As shown in FIG. 12, the moving burner 5 and the water cooler 14 are placed with a predetermined distance of each other and in parallel. Then, the moving burner 5 and the water cooler 14 are moved in direction "b." Through heating by burner 5 and water-cooling by water cooler 14, porous layer 16 is generated and the rare earth element is deposited. Here, a volatile ligand is evaporated by the heating process in quartz reaction tube 3 and porous layer 16 is formed by the water-cooling process. Also, at the same time, the rare earth element is deposited on porous layer 16. In order to flow dipivaloilmethane $(DPM)_3Er$ including Er into the quartz reaction tube 3 at 180° C., argon gas (Ar) flows at a rate of 200 ml per minute. Also, 65 ml of oxygen per minute is flowed into the first bubbler 1 including silicon tetrachloride ($SiCl_4$) at 25° C. and 400 ml of oxygen per minute flows into third bubbler 36 including $Al_2Cl_6$ at 150° C. Here, the moving burner 5 moves once in direction "b" for the deposition while the moving burner 5 moves in direction "a" for forming the cladding layer 7. The moving burner 5 moves once in the direction "b" at about 2000° C. which is measured with a pyrometer. As a result, the organic ligand dipivaloilmethane is evaporated and the remaining rare earth-erbium complex, $SiO_2$ and $Al_2O_3$, is deposited on the porous layer 16, to thereby form a core portion.

Thereafter, a sintering process for strongly fixing the deposited cladding layer 7 to the porous core layer 16 made by the water-cooling is performed. While heating the quartz reaction tube 3 to 2000° C., the moving burner 5 moves one-time in direction "c" which is the same as that for depositing the cladding layer 7. Here, carbon tetrachloride ($CCl_4$) flows so as to remove hydroxide ions ($OH^-$) which is generated when the volatile ligand is evaporated by heating and the porous layer is formed by the water-cooling, and causes optical loss. The saturated vapor pressure of carbon tetrachloride ($CCl_4$) is 173 mmHg at 25° C. and the flux of oxygen to first bubbler 1 including carbon tetrachloride is 250 ml per minute, so that 76.01 ml of silicon tetrachloride per minute is flowed into the quartz reaction tube according to the above formula (4). Here, $Cl_2$ gas generated through the reaction between $CCl_4$ and $O_2$ reacts with the hydroxide ions ($OH^-$), to thereby eliminate the hydroxide ions ($OH^-$) from the quartz reaction tube.

Then, the quartz reaction tube 3 in which cladding layer 7 and porous core layer 16 are formed through the above process is heated at a higher temperature, so that the internal space is reduced, to thereby complete the preform to which the rare earth-erbium complex is added.

An intended optical fiber doped with a rare earth-erbium complex is fabricated using a drawing tower via a stretching process (or elongation process) for providing an intended core diameter to the preform and a jacketing process for obtaining the thickness of the stretched preform as a process for making a suitable length of optical fiber cable of several tens or hundreds kilometers.

As described above, the method of fabricating the optical fiber doped with a rare earth element using the volatile complex has merit in the rare earth element contents, uniformity and impurity contents, compared with the conventional method. Comparing the fabricating method according to the present invention with the conventional method using a dopant chamber and a quartz sponge, the vapor pressure of rare earth-erbium complex in the present method is much less than that of the rare earth chloride or rare earth salt used in the conventional method, only 150–300° C. heating temperature is required, to thereby reduce the cost. Also, differently from the conventional method in which the porous layer is formed by the water-cooling and then a solution including rare earth element is added, in the present method, the amount of the added rare earth element can be easily controlled, the rare earth element with high concentration can be added, and the rare earth element can be evenly distributed. If $SiO_2$ and $Al_2O_3$ are used as the host for depositing the core layer, instead of $GeO_2$, the difference ($\Delta n$) in the refractive index between the cladding layer and the core layer is not over 0.015 in the MCVD method and the rare earth element-added solution doping method. However, according to the present invention, the difference in the refractive index is over 0.025. Also, in the present invention, differently from the method of adding the rare earth element using the volatile complex consisting of the rare earth element having an organic ligand, there are much fewer hydroxide ions ($OH^-$), which are generated when the organic ligand is volatilized and cause the optical loss of the optical fiber. As the rare earth is deposited on the porus layer formed by the water-cooling, the deposition thickness is constant and the rare earth element with a high concentration is evenly deposited.

Especially, in the rare earth element complex having the organic ligand, the impurity contents such as Fe, Cu, Ca and Si is much less, so that the original loss of the material can be decreased, thereby fabricating the optical fiber with high purity.

The specific embodiments provided above are exemplary and not limitive of the scope of the invention. Other modifications will suggest themselves to skilled artisans. The scope of the invention is to be determined by reference to the appended claims.

What is claimed is:

1. A method of fabricating an optical fiber preform by a modified chemical deposition method comprising:
    forming a cladding layer;
    forming a porous core layer on the cladding layer by sequentially heating and actively cooling an outer surface of said cladding layer through which passes a mixture of $SiCl_4$, $O_2$ and at least one volatile metal organic complex comprising rare earth ions and a ligand; and
    removing hydroxide ions ($OH^-$) from said porous core layer by reacting $CCl_4$ with additional $O_2$, and reacting $Cl_2$ gas obtained through the reaction between said $CCl_4$ and said additional $O_2$ with said hydroxide ions ($OH^-$).

2. A method of fabricating an optical fiber preform as claimed in claim 1, wherein said core layer is made without germanium.

3. A method of fabricating an optical fiber preform as claimed in claim 1, wherein a method of forming said cladding layer comprises the steps of mixing $SiCl_4$, $POCl_3$, and $O_2$, and of externally heating said mixture of $SiCl_4$, $POCl_3$, and $O_2$.

4. A method of fabricating an optical fiber preform as claimed in claim 1, wherein the mixture of $SiCl_4$, $O_2$ and at least one volatile metal organic complex further comprises at least one of a group consisting of $Al_2Cl_6$ and $SiF_4$.

5. A method of fabricating an optical fiber preform as claimed in claim 1, wherein a difference in the refractive index between said cladding layer and said porous core layer is above 0.015.

6. A method of fabricating an optical fiber preform as claimed in claim 1, wherein said ligand is composed of a cyclopentadien or a chelate compound.

7. A method of fabricating an optical fiber preform as claimed in claim 6, wherein said cyclopentadien is composed of the group consisting of tris-cyclopentadienyl and tris-isopropylcyclopentadienyl.

8. A method of fabricating an optical fiber preform as claimed in claim 6, wherein said rare earth ions are selected from the ions of an element selected from the group consisting of Dy, Er and Yb.

9. A method of fabricating an optical fiber preform as claimed in claim 6, wherein said chelate compound is composed of one of a group consisting of acetylacetone, dipivaloilmethane, trifluoracetylacetone and hexafluoracetylacetone.

10. A method of fabricating an optical fiber preform by a modified chemical deposition method, comprising:
    forming a cladding layer;
    forming a core layer on the cladding layer using $SiCl_4$, $O_2$ and at least one volatile metal organic complex comprising rare earth ions and a ligand; and
    removing hydroxide ions ($OH^-$) from said core layer by reacting $CCl_4$ with additional $O_2$, and reacting $Cl_2$ gas obtained through the reaction between said $CCl_4$ and said additional $O_2$ with said hydroxide ions ($OH^-$).

11. A method of fabricating an optical fiber preform as claimed in claim 10, wherein said core layer is made without germanium.

12. A method of fabricating an optical fiber preform as claimed in claim 10, wherein a heating process is simultaneously performed when said $Cl_2$ gas reacts with said hydroxide ions ($OH^-$).

13. A method of fabricating an optical fiber preform as claimed in claim 10, wherein a method of forming said cladding layer comprises the steps of mixing $SiCl_4$, $POCl_3$, and $O_2$, and of externally heating the mixture of the $SiCl_4$, $POCl_3$, and $O_2$.

14. A method of fabricating an optical fiber preform as claimed in claim 10, wherein said core layer is porous.

15. A method of fabricating an optical fiber preform as claimed in claim 14, wherein the method of forming said porous core layer comprises the steps of mixing said $SiCl_4$, and $O_2$ with at least one volatile metal organic complex comprising rare earth ions, and of sequentially externally heating and water cooling the mixture of $SiO_4$, $O_2$ and at least one volatile organic complex.

16. A method of fabricating an optical fiber preform as claimed in claim 15, wherein at least one of $Al_2Cl_6$ or $SiF_4$ is added during the mixing step for forming said porous core layer.

17. A method of fabricating an optical fiber preform as claimed in claim 10, wherein a difference in the refractive index between said cladding layer and said porous core layer is above 0.015.

18. A method of fabricating an optical fiber preform as claimed in claim 10, wherein said ligand is composed of a cyclopentadien or a chelate compound.

19. A method of fabricating an optical fiber preform as claimed in claim 18, wherein said cyclopentadien is composed of one of a group consisting of tris-cyclopentadienyl and tris-isopropylcyclopentadienyl.

20. A method of fabricating an optical fiber preform as claimed in claim 19, wherein said rare earth ions are selected from the ions of an element selected from the group consisting of Dy, Er and Yb.

21. A method of fabricating an optical fiber preform as claimed in claim 18, wherein said chelate compound is composed of one of a group consisting of acetylacetone, dipivaloilmethane, trifluoracetylacetone and hexafluoracetylacetone.

* * * * *